(12) United States Patent
Curtis

(10) Patent No.: US 7,329,077 B2
(45) Date of Patent: Feb. 12, 2008

(54) FASTENER APPARATUS FOR ROOFING AND STEEL BUILDING CONSTRUCTION

(76) Inventor: David A. W. Curtis, 880 Akard Dr., Reno, NV (US) 89503

( * ) Notice: Subject to any disclaimer, the term of this patent is extended or adjusted under 35 U.S.C. 154(b) by 0 days.

(21) Appl. No.: 11/110,168

(22) Filed: Apr. 20, 2005

(65) Prior Publication Data
US 2006/0002784 A1    Jan. 5, 2006

(51) Int. Cl.
*F16B 43/00*    (2006.01)
*F16B 39/282*   (2006.01)
(52) U.S. Cl. .................................. 411/371.1; 411/188
(58) Field of Classification Search ........ 411/184–188, 411/399, 411, 368, 369, 396, 371.1, 542
See application file for complete search history.

(56) References Cited

U.S. PATENT DOCUMENTS

| | | | | |
|---|---|---|---|---|
| 87,717 A | * | 3/1869 | Smith | 411/185 |
| 141,661 A | * | 8/1873 | Newton | |
| 251,788 A | * | 1/1882 | Marker | 411/362 |
| 316,619 A | * | 4/1885 | Hayes | 411/378 |
| 378,857 A | * | 2/1888 | Woodford | 411/396 |
| 951,437 A | * | 3/1910 | Gerhke | 220/304 |
| 1,820,556 A | * | 8/1931 | Campbell et al. | 411/399 |
| 1,821,709 A | * | 9/1931 | Hoerr et al. | 411/399 |
| 1,827,628 A | * | 10/1931 | Twedell | 411/424 |
| 1,830,554 A | * | 11/1931 | McMullen | 411/399 |
| 1,894,708 A | * | 1/1933 | Sardeson | 411/176 |
| 2,049,259 A | * | 7/1936 | Greenwell | 411/399 |
| 2,053,918 A | * | 9/1936 | Peretsman | 138/98 |
| 2,056,688 A | * | 10/1936 | Peterka et al. | 411/399 |
| 2,086,086 A | * | 7/1937 | Lassonde | 411/371.1 |

(Continued)

FOREIGN PATENT DOCUMENTS

DE    102004 021484.0    *    4/2004

(Continued)

*Primary Examiner*—Flemming Saether
(74) *Attorney, Agent, or Firm*—Charles L. Thoeming

(57) ABSTRACT

A fastener apparatus includes a frusto-hemispherical head portion having a flat top surface, a curved outer surface, a base portion, and a peripheral edge, with the flat top surface bearing a tool fitting. A downwardly-depending lip portion extends from the head peripheral edge and defines an annular recess in the base, the annular recess having a flat upper surface. The lip has a curved outer edge, a curved lower edge, and an inner edge having a curved lower portion and a vertical upper portion terminating in the annular recess flat upper surface. A shank portion is connected to the base and bears screw threads and a tip. An annular gasket portion is carried on the shank, and has a first uncompressed position contained radially within the annular recess, and a second compressed position extending radially beyond the lip outer edge. As the fastener is installed in a workpiece, the gasket expands to contact the lip inner edge and extend beneath the curved lower edge to form a seal between the fastener head and the workpiece. The fastener may include locking teeth terminating in the head base, adapted to resist loosening of the fastener from the workpiece. The curved outer surface of the fastener may include asymmetric ridges adapted to mechanically engage moving snow or ice to resist loosening of the fastener from the workpiece. The fastener head preferably has a width to height ratio of between 3:1 to 5:1.

23 Claims, 6 Drawing Sheets

U.S. PATENT DOCUMENTS

| | | | | |
|---|---|---|---|---|
| 2,322,811 A | * | 6/1943 | Ball | 411/378 |
| 2,752,814 A | * | 7/1956 | Iaia | 411/542 |
| 2,982,166 A | * | 5/1961 | Hobbs | 411/399 |
| 3,175,454 A | * | 3/1965 | Morse | 411/542 |
| 3,230,818 A | * | 1/1966 | Siebol | 411/34 |
| 3,241,422 A | * | 3/1966 | Heimovics | 411/371.1 |
| 3,247,752 A | * | 4/1966 | Greenleaf et al. | 411/542 |
| 3,399,589 A | * | 9/1968 | Breed | 411/428 |
| 3,500,712 A | * | 3/1970 | Wagner | 411/371.1 |
| 3,551,015 A | * | 12/1970 | Whiteside et al. | 403/408.1 |
| 3,557,654 A | * | 1/1971 | Weidnerm, Jr. | 411/396 |
| RE27,085 E | * | 3/1971 | Weidner, Jr. | 411/371.1 |
| 3,572,414 A | * | 3/1971 | Onufer | 411/270 |
| 3,584,531 A | * | 6/1971 | Greenleaf | 411/371.1 |
| 3,605,845 A | * | 9/1971 | Junker | 411/185 |
| 3,661,046 A | * | 5/1972 | Waud et al. | 411/369 |
| 3,667,340 A | * | 6/1972 | Black et al. | 411/38 |
| 3,726,553 A | * | 4/1973 | Reynolds et al. | 403/408.1 |
| 3,803,972 A | * | 4/1974 | Deutsher | 411/337 |
| 3,863,300 A | * | 2/1975 | Becker | 24/291 |
| 3,882,752 A | * | 5/1975 | Gutshall | 411/371.1 |
| 3,885,492 A | * | 5/1975 | Gutshall | 411/373 |
| 3,903,784 A | * | 9/1975 | Dekker | 411/399 |
| 3,958,389 A | * | 5/1976 | Whiteside et al. | 403/279 |
| 4,015,505 A | * | 4/1977 | Murray | 411/80.6 |
| 4,033,243 A | * | 7/1977 | Kirrish et al. | 411/338 |
| 4,074,608 A | * | 2/1978 | Siebol | 411/43 |
| 4,093,285 A | * | 6/1978 | Fayle | 292/251 |
| 4,154,138 A | * | 5/1979 | Melone | 411/373 |
| 4,170,919 A | * | 10/1979 | Siebol | 411/43 |
| 4,170,920 A | * | 10/1979 | Siebol | 411/43 |
| 4,310,272 A | * | 1/1982 | Rich et al. | 411/185 |
| 4,310,273 A | * | 1/1982 | Kirrish | 411/338 |
| 4,460,300 A | * | 7/1984 | Bettini et al. | 411/375 |
| 4,516,893 A | * | 5/1985 | Barth | 411/184 |
| 4,518,294 A | * | 5/1985 | Barth | 411/188 |
| 4,580,936 A | * | 4/1986 | Francis et al. | 411/38 |
| 4,609,317 A | * | 9/1986 | Dixon et al. | 411/339 |
| 4,657,459 A | * | 4/1987 | Landt | 411/188 |
| 4,657,460 A | * | 4/1987 | Bien | 411/258 |
| 4,696,610 A | * | 9/1987 | Wright | 411/38 |
| 4,701,088 A | * | 10/1987 | Crull | 411/369 |
| 4,705,441 A | * | 11/1987 | Arnold | 411/188 |
| 4,749,319 A | * | 6/1988 | Sygnator | 411/188 |
| 4,749,321 A | * | 6/1988 | Knohl et al. | 411/371.1 |
| 4,764,066 A | * | 8/1988 | Terrell et al. | 411/187 |
| 4,812,095 A | * | 3/1989 | Piacenti et al. | 411/188 |
| 4,820,076 A | * | 4/1989 | Rossigno | 403/284 |
| 4,820,235 A | * | 4/1989 | Weber et al. | 411/188 |
| 4,828,275 A | * | 5/1989 | Udagawa | 277/596 |
| 4,842,463 A | * | 6/1989 | Landt | 411/188 |
| 4,875,818 A | * | 10/1989 | Reinwall | 411/369 |
| 4,887,951 A | * | 12/1989 | Hashimoto | 411/371.1 |
| 4,948,318 A | * | 8/1990 | Nottelmann et al. | 411/377 |
| 4,948,319 A | * | 8/1990 | Day et al. | 411/377 |
| 5,188,495 A | * | 2/1993 | Jones, Jr. | 411/369 |
| 5,249,882 A | * | 10/1993 | Nagoshi et al. | 411/399 |
| 5,262,197 A | * | 11/1993 | Pollizzi | 427/195 |
| 5,304,023 A | * | 4/1994 | Toback et al. | 411/387.3 |
| 5,338,141 A | * | 8/1994 | Hulsey | 411/375 |
| 5,388,563 A | * | 2/1995 | Hsu | 124/23.1 |
| 5,487,633 A | * | 1/1996 | Roberts | 411/387.3 |
| 5,553,578 A | * | 9/1996 | Nguyen | 123/142.5 E |
| 5,622,464 A | * | 4/1997 | Dill et al. | 411/399 |
| 5,634,755 A | * | 6/1997 | Jones, Jr. | 411/383 |
| 5,649,511 A | * | 7/1997 | Nguyen | 123/198 R |
| 5,725,345 A | * | 3/1998 | Zhov | 411/369 |
| 5,746,039 A | * | 5/1998 | Nystrom | 52/639 |
| 5,846,040 A | * | 12/1998 | Ueno | 411/45 |
| 5,906,463 A | * | 5/1999 | Damm et al. | 411/369 |
| 5,957,641 A | * | 9/1999 | Bogatz et al. | 411/43 |
| 5,980,147 A | * | 11/1999 | Journee | 403/119 |
| 6,012,763 A | * | 1/2000 | Clemente et al. | 296/186.4 |
| 6,231,286 B1 | * | 5/2001 | Bogatz et al. | 411/371.1 |
| 6,244,807 B1 | * | 6/2001 | Garcia | 411/369 |
| 6,283,691 B1 | * | 9/2001 | Bogatz et al. | 411/371.1 |
| 6,290,444 B1 | * | 9/2001 | Dicke | 411/399 |
| 6,293,744 B1 | * | 9/2001 | Hempfling et al. | 411/372.5 |
| 6,394,725 B1 | * | 5/2002 | Dicke | 411/399 |
| 6,558,097 B2 | * | 5/2003 | Mallet et al. | 411/399 |
| 6,623,226 B2 | * | 9/2003 | Braun et al. | 411/353 |
| 6,626,626 B2 | * | 9/2003 | Hartmann et al. | 411/353 |
| 6,758,625 B1 | * | 7/2004 | Lawrence | 403/388 |
| 6,764,262 B1 | * | 7/2004 | Hargis | 411/371.1 |
| 7,024,270 B2 | * | 4/2006 | Mauer et al. | 700/175 |
| 2001/0038781 A1 | * | 11/2001 | Mallet et al. | 411/399 |
| 2003/0175093 A1 | * | 9/2003 | Walther | 411/371.1 |
| 2005/0244249 A1 | * | 11/2005 | Sussenbach | 411/411 |

FOREIGN PATENT DOCUMENTS

EP   516430 A1 * 12/1992

* cited by examiner

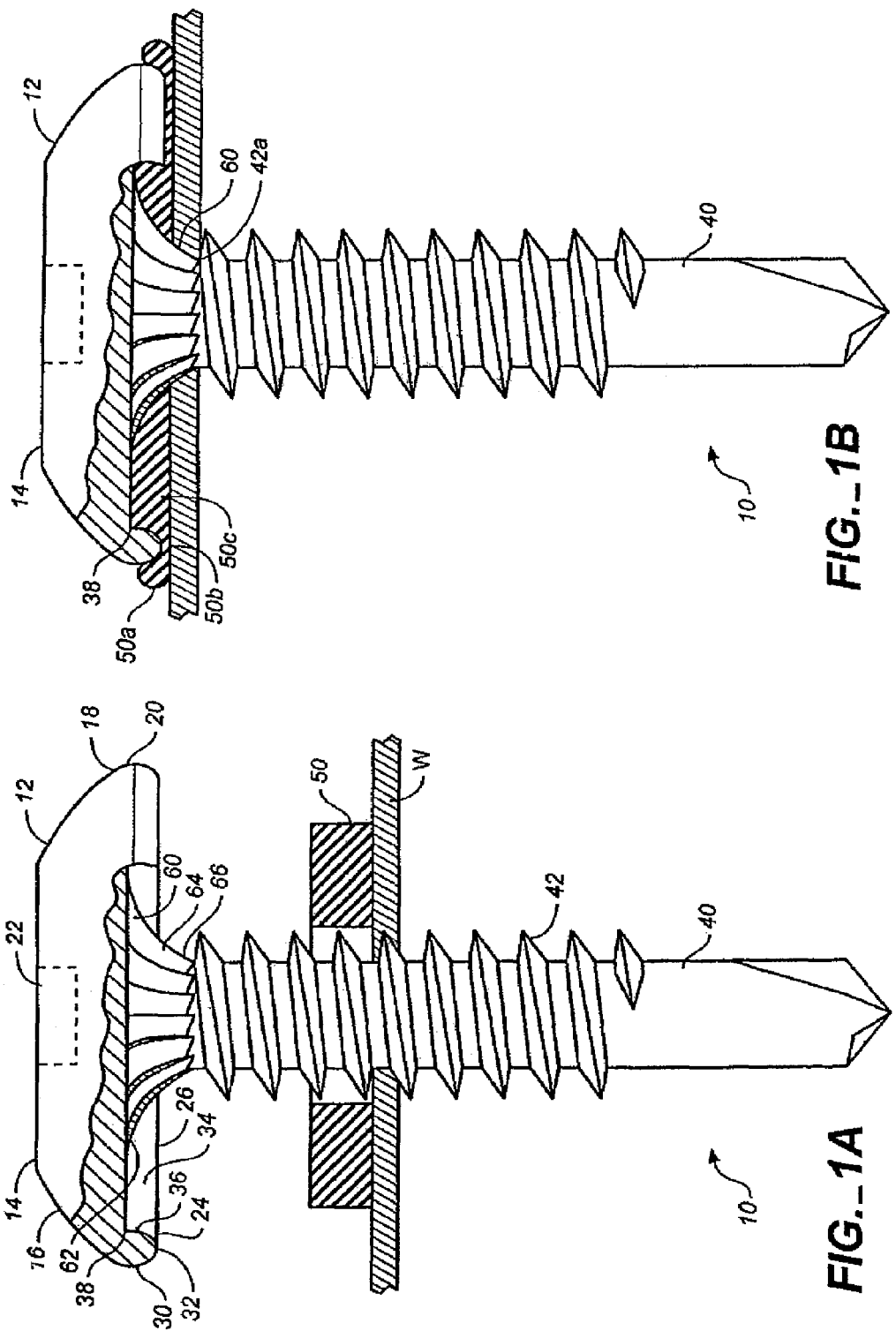

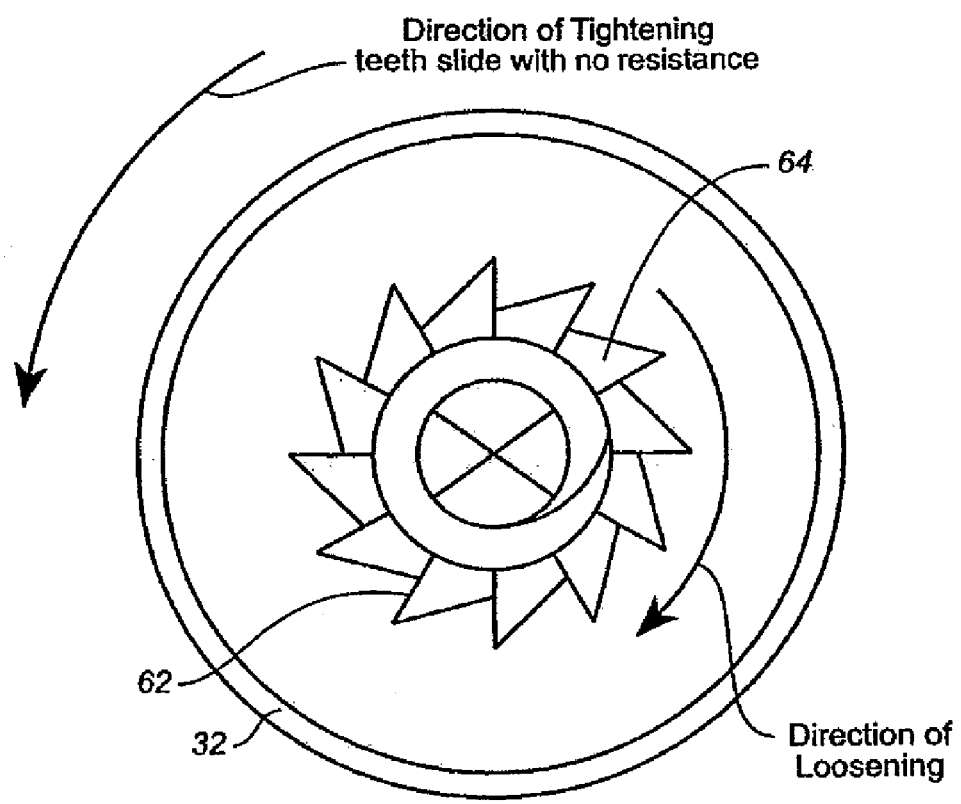
FIG._1C

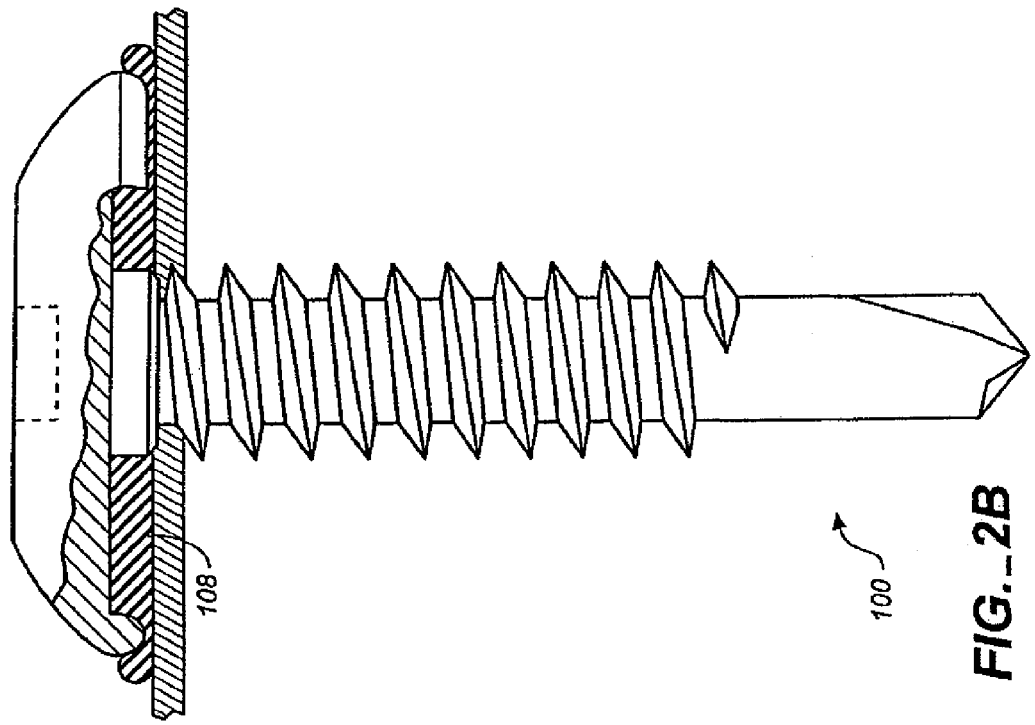
FIG._2B
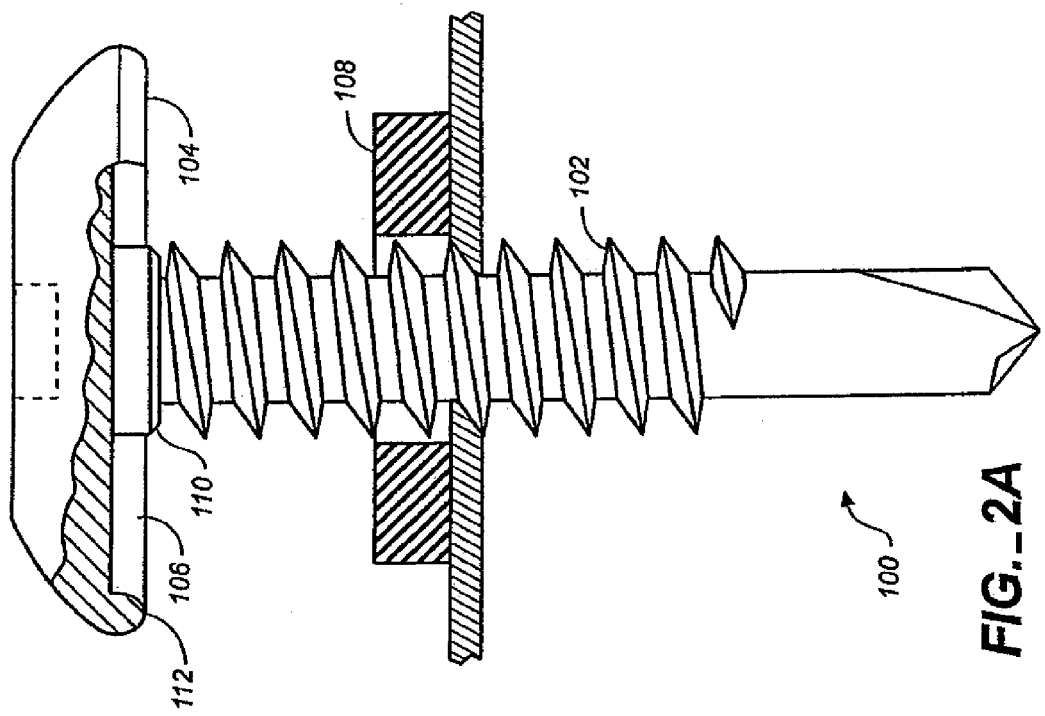
FIG._2A

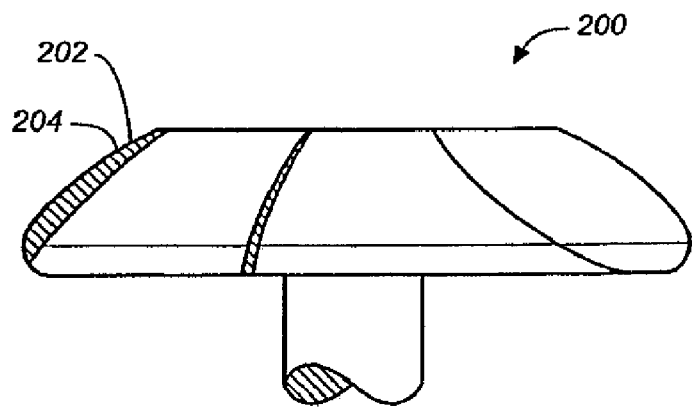
*FIG._3A*
Snow and Ice Sliding Down off the Slope of Structure
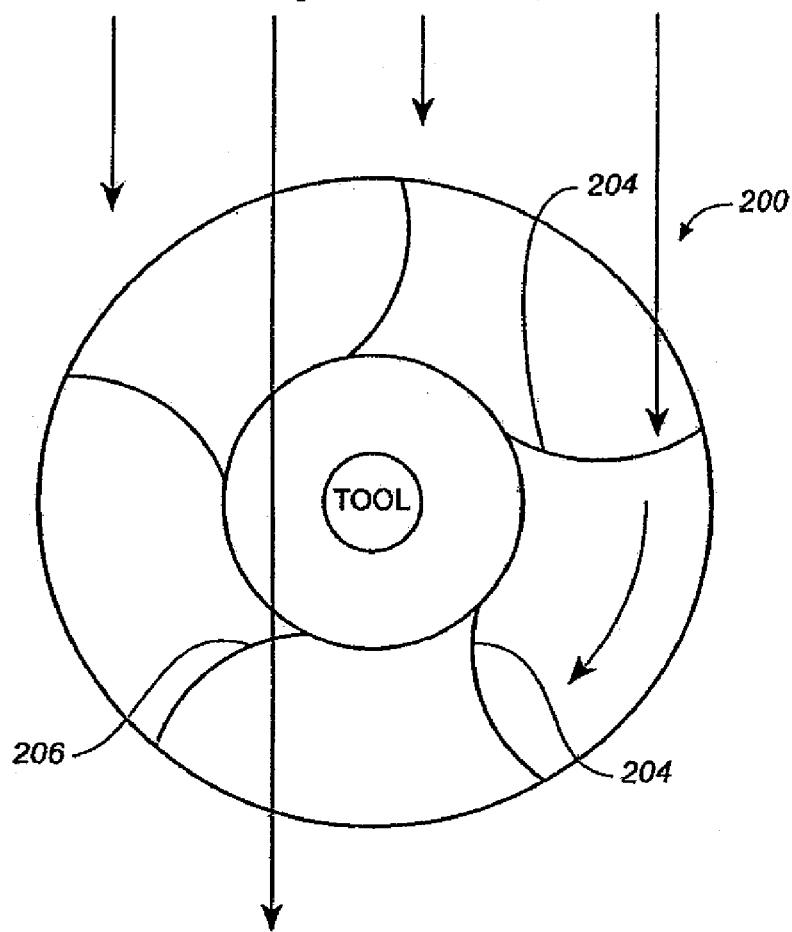
*FIG._3B*

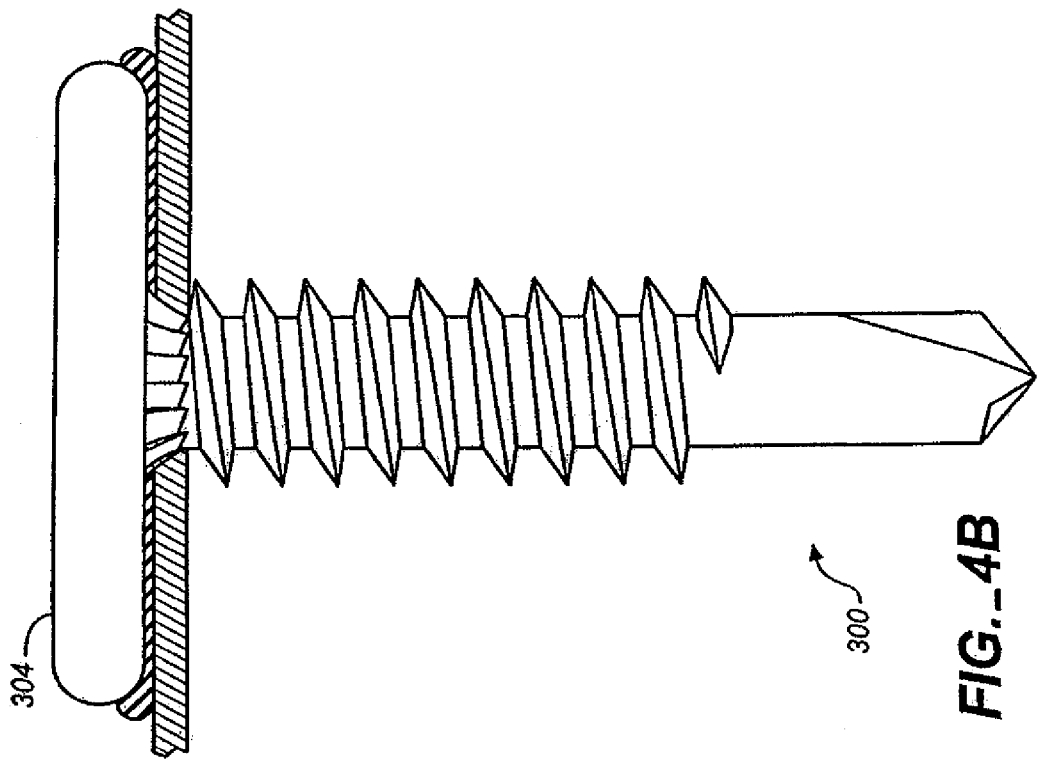
FIG._4A
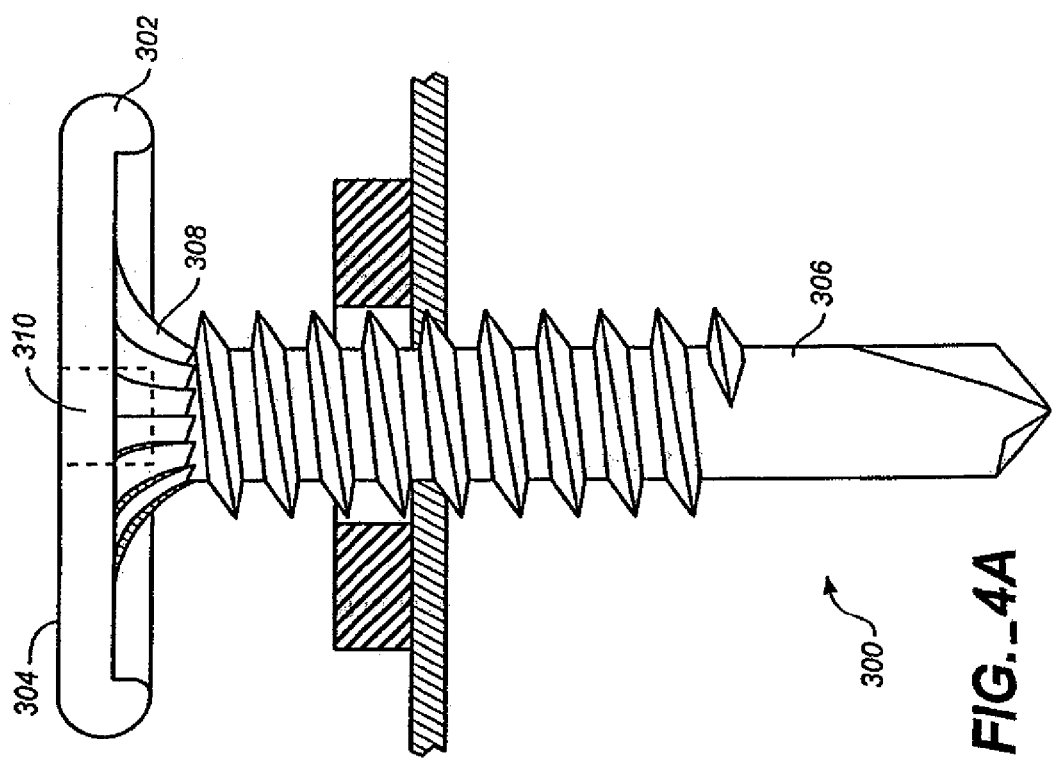
FIG._4B

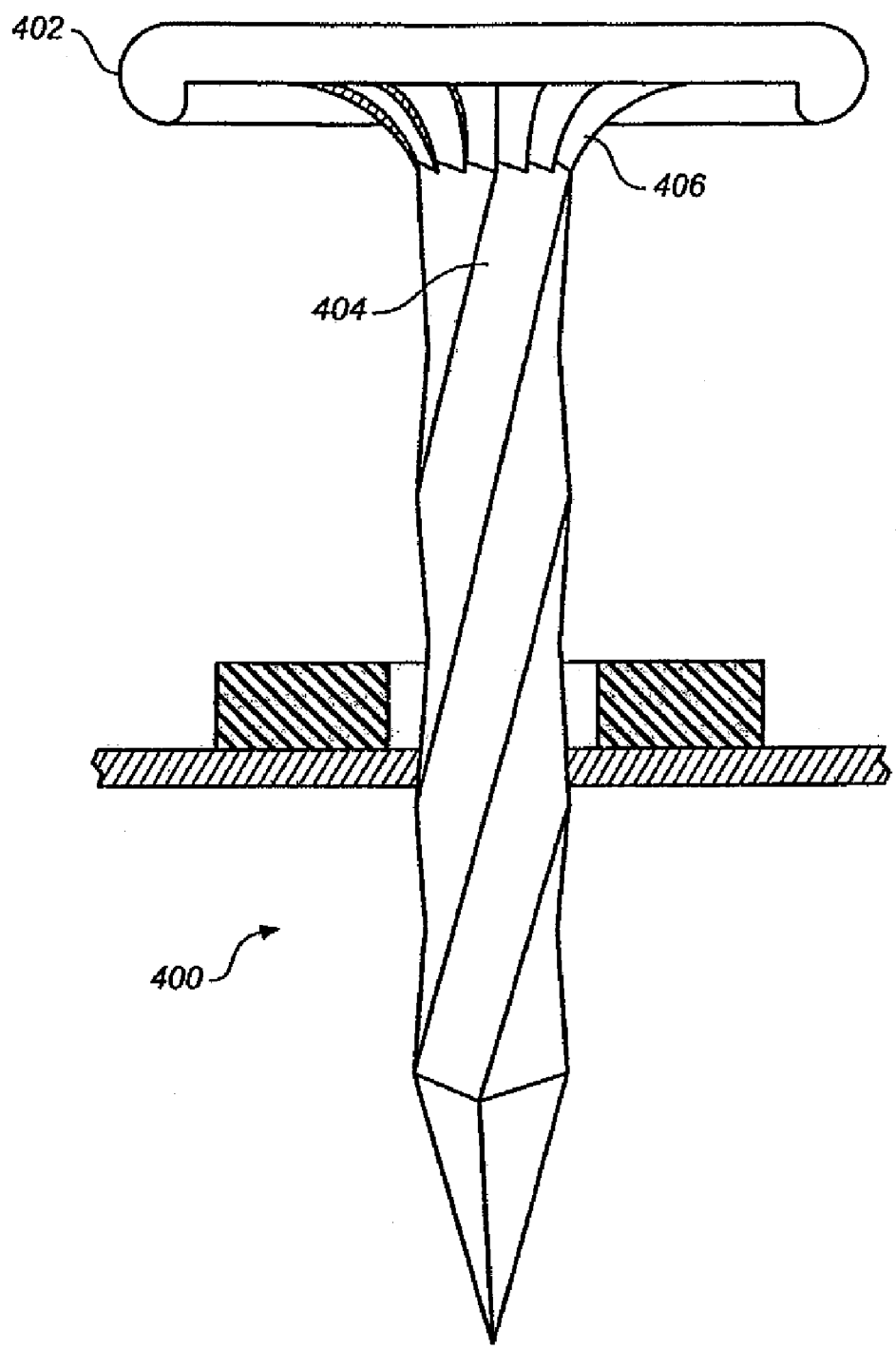
FIG._5

FASTENER APPARATUS FOR ROOFING AND STEEL BUILDING CONSTRUCTION

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to construction hardware, and more particularly to an improved fastener apparatus for use in roofing and steel building construction.

BACKGROUND INFORMATION AND DISCUSSION OF RELATED ART

Fasteners for use in roofing and steel building construction currently include the ring shank self-sealing nail and the self-sealing hex head. Manufacturers of metal roofing panels recommend that the original self-sealing fasteners be replaced every five years. This replacement is necessary because the rubber seals used on the fasteners are damaged by the sun's UV rays in five years. In addition, snow falls and lands on the rooftop, and when the snow tries to slide off the roof it packs against the high profile heads of the existing screws and builds up, staying on the roof by hanging on the high profile hex head screw. The high profile screw heads cause the snow and ice to build up to a great weight before unloading, because the screw heads act like little dams, stopping the snow from unloading. Ice is caused when the heat from inside the home melts the underside of the snow load in the daytime and it then re-freezes each night. Once the weight of the snow and ice is too much for the fasteners to support, the snow breaks free and violently unloads from the roof. The friction caused by the ice tearing and ripping its way over the hex head screws as it unloads from the roof is exactly what destroys the fasteners. These forces are too great and the cause is the vertical walls and high profile caused by the hex head fasteners themselves.

U.S. Pat. No. 4,701,088 to Crull discloses an undercut, sealing threaded fastener for engagement with an internally threaded workpiece, and a method of forming the same as provided. The fastener comprises a driver head and a shank extending axially from an undersurface of the driver head. The shank includes an intermediate unthreaded portion and a threaded portion defining a given thread form having a crest diameter and a given root diameter. An undercut groove is provided in the undersurface of the driver head, this undercut groove having an inner diameter no greater than the crest diameter of the internal or female thread, and preferably also no greater than the root diameter of the external thread, and an outer diameter greater than the crest diameter. An unthreaded shank portion is formed intermediate the threaded shank portion and the driver head and extends continuous with the inner diameter of the undercut groove. This unthreaded shank portion thus having an outer diameter no greater than the internal thread crest diameter and preferably not greater than the external thread root diameter. An annular sealing ring is engaged about the unthreaded shank portion and extends into the groove.

U.S. Pat. No. 5,622,464 to Dill, et al. teaches a screw for use with a washer as a sealing fastener having formations near the head of the screw to increase driving resistance when the portion having the formations reaches a surface into which the screw is being drilled. The screw includes a shank with a tip end and a head end. A head at the head end may be driven by a driving tool such as a pneumatic or electric drill. To facilitate retention of the washer the head has a flange that forms a recess. The shank has an enlarged portion near the head adjacent to the recess and the enlarged portion has ridges. The enlarged portion, including the ridges, increases the driving resistance of the screw. This increase in resistance gives notice to an operator of the driving tool that an appropriate driving depth and torque have been achieved. Preferably, the washer has an inner diameter surface with fully radiused projections. The projections assist in mounting the washer to the screw and keeping the washer appropriately positioned on the screw during driving of the screw.

U.S. Pat. No. 6,231,286 to Bogatz, et al., describes a headed fastener with a precisely calculated groove under the head to accommodate an O-ring sealing member as a self-sealing assembly for sealed engagement with a workpiece. The fastener has a head having a lower face, and a shank extends from the lower surface of the head. A groove is formed in the lower surface, the groove having an inner wall and an outer wall. The inner wall has a proximal end which is adjacent the lower surface of the head and which is disposed radially remotely from the shank. A sealing element, such as an O-ring, is disposed at least partially within the groove. The groove may be configured so that a distal end of the inner wall is near to the axis of the shank than is the proximal end of the inner wall.

U.S. Pat. No. 6,764,262 to Hargis discloses a weatherproof fastener having a shank and head, the latter formed with a recess in its lower surface. A gasket is positioned in the recess, which it partially fills until the screw is employed to joint two elements and the gasket is compressed so that it fills the entirety of the recess, thereby preventing the ingress of undesirable materials.

The foregoing patents reflect the current state of the art of which the present inventor is aware. Reference to, and discussion of, these patents is intended to aid in discharging Applicant's acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

BRIEF SUMMARY OF THE INVENTION

The present invention provides an improved fastener apparatus for use in roofing and steel building construction. The inventive fastener includes a frusto-hemispherical head portion having a flat top surface, a curved outer surface, a base portion, and a peripheral edge, with the flat top surface bearing a tool fitting. A downwardly-depending lip portion extends from the head portion peripheral edge and defines an annular recess in the base portion, the annular recess having a flat upper surface. The lip portion has a curved outer edge, a curved lower edge, and an inner edge having a curved lower portion and a vertical upper portion terminating in the annular recess flat upper surface. A shank portion is connected to the base portion, the shank portion bearing screw threads and a tip portion in the traditional manner. An annular gasket portion is carried on the shank portion, the gasket portion having a first uncompressed position contained radially within the annular recess, and a second compressed position extending radially beyond the lip portion outer edge. As the fastener is installed in a workpiece, the gasket expands to contact the lip portion inner edge and extend beneath the curved lower edge to form a seal between the fastener head portion and the workpiece. The inventive fastener apparatus preferably includes locking teeth terminating in the head base portion, adapted to resist loosening of the fastener from the workpiece. Alternatively, the fastener shank portion may include a depth gauge adapted to resist over tightening of the fastener to the workpiece. The curved outer surface of the fastener may also include asymmetric ridges adapted to mechanically engage moving snow or ice to resist loosening of the fastener from the workpiece. The fastener head portion preferably has a width to height ratio of between 3:1 to 5:1.

The head of the inventive fastener should have a profile as low as possible to reduce friction during snow unloading. This low profile shape should also have a smooth aerodynamic shape to reduce wind buffeting which causes panel vibration in high wind areas. The design should have a recess under the head to hold the rubber seal. The recess should be as wide and as deep as possible so the seal can expand during application and create a barrier of rubber between the lip of the screw head and the panel or product being fastened. This prevents the lip from scratching the zinc coat or paint from the surface of the product below, therefore causing the protective coating to be destroyed and enabling rust. This barrier of rubber between the lip and the panel being fastened also protect the metal fastener and the metal panel from electrolysis which advances the aging process of both fastener and panel.

The lip should also have four specific features to it. The first is on the inside of the lip, the top half of which should be a vertical wall to stop the seal from expanding wider and cause it to expand downward against the surface below, but the bottom edge should be rounded to allow the rubber seal to squeeze out from beneath the screw and not be cut or pinched. The second is the bottom edge of the lip, which should not be flat which would create a sharp edge and then could easily scratch protective coatings, but should be rounded to reduce the possibility of scratching the coatings and also to not cut or pinch the rubber seal that is supposed to be escaping the recess. The third is the outside edge of the lip, which should also be rounded so as to not cut the rubber seal that is escaping from the recess, and not to scratch the painted surface should the seal be pinched anyway, but also and foremost for the reason that if the fastener is installed at an angle the outer rim will be the first to make contact and a rounded edge will do less damage to the protective paint or coating on the panel being fastened.

The fastener may also have a locking teeth design that should be sharpened opposite the direction of application, which allows the fastener to be applied and the teeth to slide in easily without removing any metal. This sharpened angle will expand the rubber seal without damaging it during application. The teeth should extend below the head line to ensure contact with the panel or product being fastened and lock itself down should forces attempt to unscrew the fastener. Next, the thickness and the width of the rubber seal should be in the proper ratio to the depth and width of the recess in the head, working in unison with the locking teeth.

All of these features act together as a depth gauge to stop the rim of the screw from making contact with the panel being fastened below. First, the thick and wide rubber seal make contact which informs the operator that the head is nearly installed, and for installation to slow down or stop. Second, the locking teeth make contact with the raised cone-shaped deformity in the panel (which is caused by the screw threads penetrating the metal panel) and the teeth dramatically increase resistance and slow the installation. The second dramatic slow down informs the installer that the locking teeth have made contact with the metal panel and the installation is complete. The locking teeth preferably begin below the headline at the threads to ensure contact, but the teeth begin at a near vertical angle and curve wider as they approach the head. This curved V-shave versus a sharp straight line V-shape allows the teeth to slide into the rubber seal and metal panel to spread the seal without damaging it, and to make contact with the metal panel and not remove any metal which will serve as a surface for the locking teeth to bite into.

It is therefore an object of the present invention to provide a new and improved fastener that can withstand the elements.

It is another object of the present invention to provide a new and improved fastener that provides a high pressure water seal.

A further object or feature of the present invention is a new and improved fastener that will not scratch the protective coating on metal panels.

An even further object of the present invention is to provide a novel fastener that will not cause electrolysis between the screw head and metal panel.

Other novel features which are characteristic of the invention, as to organization and method of operation, together with further objects and advantages thereof will be better understood from the following description considered in connection with the accompanying drawing, in which preferred embodiments of the invention are illustrated by way of example. It is to be expressly understood, however, that the drawing is for illustration and description only and is not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein:

FIG. 1A is a side elevation view in partial cross-section of a locking teeth embodiment of a fastener apparatus of this invention during installation;

FIG. 1B is a side elevation view in partial cross-section of the fastener apparatus of FIG. 1A as installed;

FIG. 1C is a bottom end view of the fastener apparatus of FIG. 1A;

FIG. 2A is a side elevation view in partial cross-section of an alternate (no locking teeth) embodiment of a fastener apparatus of this invention during installation;

FIG. 2B is a side elevation view in partial cross-section of the fastener apparatus of FIG. 2B as installed;

FIG. 3A is a side elevation view of a self-tightening head embodiment of a fastener apparatus of this invention;

FIG. 3B is a top plan view of the fastener apparatus of FIG. 3A as installed;

FIG. 4A is a side elevation view in partial cross-section of a flat head embodiment of a fastener apparatus of this invention during installation;

FIG. 4B is a side elevation view of the fastener apparatus of FIG. 4A as installed; and FIG. 5 is a side elevation view in partial cross-section of a nail head and elongated threaded shank embodiment of a fastener apparatus of this invention during installation.

DETAILED DESCRIPTION OF THE INVENTION

Referring to FIGS. 1 through 5, wherein like reference numerals refer to like components in the various views, there is illustrated therein a new and improved fastener apparatus, generally denominated 10 herein.

FIG. 1A is a side elevation view in partial cross-section of a locking teeth embodiment of a fastener apparatus 10 of this invention during installation, while FIG. 1B is a side elevation view and FIG. 1C is a bottom end view. The inventive fastener 10 includes a frusto-hemispherical head portion 12 having a flat top surface 14, a curved outer surface 16, a base portion 18, and a peripheral edge 20, with the flat top surface bearing a tool fitting 22. A downwardly-depending lip portion 24 extends from the head portion peripheral edge 20 and defines an annular recess 26 in the base portion 18. The annular recess 26 has a flat upper surface 28. The lip portion 24 has a curved outer edge 30, a curved lower edge 32, and an inner edge 34 having a curved lower portion 36 and a vertical upper portion 38 terminating in the annular recess flat upper surface 28. A shank portion 40 is connected to the base portion 18, the shank portion bearing screw threads 42 and a tip portion 44 as is well known in the art.

An annular gasket portion 50 is carried on the shank portion, the gasket portion having a first uncompressed position contained radially within the annular recess (e.g., FIG. 1A), and a second compressed position extending radially beyond the lip portion outer edge (FIG. 1B). As the fastener is installed in a workpiece, the gasket 50 expands to contact the lip portion inner edge 34 and extend beneath the curved lower edge 32 to form a seal between the fastener head portion and the workpiece W.

The flat top 14 is designed to reduce the low profile of the head as much as possible and still allow enough material in the head to accommodate an inset tool fitting 22. The wider or larger a tool fitting that is used in the fastener head the wider the flat spot should be. A balance between the tool fitting size and the shank size should be adhered to so as to not weaken the head strength by using too large a tool fitting or by using too deep a tool fitting. The flat top is "pre-formed" into the head so that whatever type of tool fitting is used the tool fitting is accurately punched into the head without flaws or defects. This will also reduce the cost and necessity for retooling by not punching into a rounded head that would wear out tool fittings much faster.

The flat spot reduces friction between the head and snow, ice, pine needles, leaves, branches, etc. from having anything on the fastener to build up on. Snow and ice that naturally occurs builds up and then unloads over the screw heads is a damaging element to any fastener. The act of thousands of pounds of snow and ice unloading, rips and cuts it's way over the existing fasteners and actually unscrews them and/or tears them completely out. The flat spot is also intended and designed to reduce wind buffeting that will cause building and panel vibration, which will weaken fasteners contact and wear out the seal over time.

The rounded or convex outer head surface 16 is designed in a shallow rounded manner to give a smooth surface and a low profile "ramp" to the leading edge of the fastener head. This allows snow and ice, branches, pine needles, etc. to ramp or jump over the head, and reduces the impact or friction caused when snow and ice are naturally unloading from the roof.

The recess 26 is designed very wide and as deep as possible to accommodate a large (and therefore strong) rubber seal 50. The seal is to be trapped and protected under the head of the fastener but the recess is also designed to allow a small amount of the rubber seal to escape and create a barrier of rubber between the outer rim of the recess and the metal panel being fastened. The desired effect of using a large strong seal is to have a seal that can withstand the pressure of the head tightening around it and the seal will not fail before the rib of the panel bends below it. The ribs of a metal roof will dent at a certain pressure and the installer should stop applying pressure to the screw before this happens. In other words there is a limit to how much pressure can be applied to the panel, therefore a balance or ratio of rubber seal thickness and width must be obtained for the fasteners head to seat down properly without causing too much pressure and bending of the roofing panel being fastened.

A further desired effect is to create three seals out of one seal. The first seal 50a is the rubber that escapes from the recess. Water, UV and the elements attack this area of the seal first. The second seal 50b is the barrier of rubber seal pinched between the bottom edge 32 of the lip 24 and the panel being fastened. The third seal 50c is the rubber seal that is entirely trapped and protected within the recess 26. Thus the inventive fastener provides three areas of sealing to stop water from leaking, rusting from scratching and electrolysis between the two metals.

The vertical upper portion 38 of the lip 24 should be vertical or a steep annular shape to give the top edge of the rubber grommet 50 a place to seat itself and stop the seal from expanding laterally and to start the seal expanding downward. The annular shape should be as steep towards vertical as possible or vertical so as to not allow the rubber seals top edge to escape from the recess, before the head has had a chance to seat down enough to trap the seal. The top half is vertical or steep annular and smoothly flows into the lower half 36 that is rounded and allows the lower half of the rubber grommet 50 to escape from the recess 26.

The outside edge 30 of the lip portion 24 should be rounded. The rubber seal 50 is intended to squeeze out under the extreme high pressure the recess applies to the rubber seal upon final tightening. The rounded outside edge 30 of the lip will not pinch or cut the rubber seal that is allowed to escape from the recess.

The outside edge 30 is also rounded to reduce the chances of the outer edge of the fastener scratching the painted or otherwise protective coated panel being fastened. A fastener installed incorrectly at a slight angle may allow for the rim of the fastener to make contact with the painted or protected panel and scratch it. A rounded edge is less likely to scratch deep enough to cause rusting and premature aging.

The bottom edge 32 of the lip portion 24 should also be rounded to prevent pinching of the rubber seal as it expands radially outward. The bottom edge 32 is also designed in this rounded manner to reduce the chances of the outer edge of the fastener scratching the painted or otherwise protective coated panel being fastened.

The curved lower portion 36 of the lip portion 24 should be rounded to allow for a small amount of the rubber seal 50 to escape without being cut into by a sharp edge at the inside bottom edge of the lip. A lip with a sharpened edge in this location would allow that sharp edge to cut into the rubber seal and cause damage that may result in complete seal failure. This design allows for a small amount of seal to escape but the majority of the seal be trapped, all during a very quick motion at the last second as the fastener head reaches the bottom and tightens down, but not to pinch to hard and damage the seal under the outer rim in the process. Simply put rubber can form to a rounded shape better then to a sharp edge without damaging the rubber.

The overall total width of the lip portion is important in the design and should be located at the extreme outer edge of the fastener heads underside. The lip should be as thin as possible (widthwise) to allow for a very wide rubber seal or grommet to be wide enough to be near the edge of the fastener. The purpose is to fill the entire void of the recess and allow for the excess rubber seal to escape and create a rubber barrier between the metal fastener head and the metal panel being fastened. However, the lip should also have a minimum width to it so as to not create a sharp edge. The width and roundness of the lip should accommodate the flexing characteristics of the rubber seal or grommet used.

FIGS. 1A-1C also illustrate locking teeth 60 adapted to resist loosening of the fastener from the workpiece. The vertical wall side 62 of the locking teeth must be the trailing edge side as the fastener is applied and the leading edge side as the fastener is unscrewed. The purpose for this design feature is for the vertical wall to be sharp when unscrewing but not sharp while fastening or applying. The leading edge while applying a fastener would become the trailing edge when unscrewing the fastener. Sloping wall side 64 is a long and gradual slope down from the top or sharp point of one high vertical wall 62 to the low point at the next vertical wall in the next locking tooth. Together these features create teeth that are sharpened in a direction opposite to the direction of tightening a fastener.

This design allows for the teeth to slide in during application and not damage the rubber seal. The teeth will slide past the rubber seal without cutting or tearing the seal, which might cause damage. This design also allows the teeth to penetrate the metal panel being fastened without removing any metal that will in turn become a place for the teeth to bite into and stop the fastener from unscrewing.

The anti-back-out teeth also provide more mass for a larger connection from the shank or threaded portion of the fastener to the head or top of the fastener. This makes the head connection stronger and increases the screws resistance to head shear. Head shear can occur when snow and ice tear at the screw head and or when the roofing panel itself is pulled parallel to the roofing substructure causing a scissor like effect on the fastener.

The width of the anti-back-out teeth creates a stronger head connection, which allows for a deeper tool fitting. Theoretically a tool fitting can be cut through the head of the fastener directly into the vicinity of the shank and locking teeth. The shank would have to be large enough so the teeth could retain the same strength as a shank of the same dimensions. Also the tool fitting could not penetrate too far into the shank as to weaken it below standards.

The curved flare shape 66 of the teeth should begin at the shank 40 at a near vertical angle and curve outward as the teeth near the underside of the head 12. At the head the teeth angle should be nearly horizontal. This curve further helps the locking teeth to slide inward into the rubber seal while expanding it without damaging it. The curved flare shape of the teeth helps to ensure that material from the panel, which is to serve as a place for the teeth to bite into, will not be removed during installation of the fastener.

The curved flare shape of the teeth also helps to stop the raised metal protrusion (caused during the threads penetration of the panel) from damaging the rubber seal at the end of installation. When a fastener penetrates a metal panel a small raised protrusion of metal rises up on one side of the threads. The bottoms of the inventive teeth are near vertical and protrude below the bottom line of the head so they ensure contact with the metal panel, but at the midpoint the teeth are flaring at roughly a 45-degree angle, which stops the metal protrusion from riding up into the recess any farther and causing damage to the rubber seal.

The depth of the teeth should extend below the headline or the very lowest point of the head. This is to ensure contact between the locking teeth and the panel being fastened. The curved flare and depth of the locking teeth work together to force their way into a metal panel and cause the panel to stretch around and form to the teeth, ensuring a good lock.

There is a certain ratio that should be achieved between the width and depth of the purposely-wide recess and the width and thickness of the rubber seal or grommet. The desired effect is to have a wide enough recess and a wide enough seal, to have it near the edge of the screw head as possible before tightening causes the seal to expand under pressure. This means that when the rubber seal expands, a small amount (e.g., 0.05% to 5%) of the rubber seal will escape from the recess. The seal that escapes creates two separate features: a barrier of rubber between the bottom of the lip rim and the panel being fastened is squeezed out from the recess. This stops the lip of the fastener head from scratching the painted surface of the panel being fastened. Also, a first seal is created outside the recess and around the perimeter of the fastener head.

This first seal area is created outside the recess and around the perimeter of the fastener head when the fastener is tightened down. Because the fastener design incorporates rounded edges on the lip, the excess rubber seal that is allowed to squeeze out creates a seal outside of the recess. However, this "exposed" seal is more vulnerable to the elements and will be destroyed faster than the protected seal. For this reason it is preferable to keep a proper ratio of rubber to recess so as to limit the rubber that escapes from the recess to just under the lip. It is desirable for some of the seal to escape to the lip and past, but past only due to manufacturing flaws. It is preferable to minimize this feature as much as possible to keep the rubber seal from escaping into the direct elements. There is an advantage to having exposed rubber outside of the recess, in that it will be the first attacked by the elements before the rubber inside the recess ever even begins to wear, which may extend the life of the rubber seal. The fluctuations in manufacturing will allow some fasteners seals to escape more than others.

The excess rubber seal that purposely squeezes out from the recess and creates the rubber barrier of seal under the bottom edge of the lip also becomes a more dense and compacted seal than the exposed seal, but only after the outer exposed seal has worn away. This area becomes the second line of defense, as it will wear out before the rubber seal that is fully trapped and protected in the recess. The outer rubber seal may break free from the screw head after years of UV and the elements drying out the excess seal.

The seal that is fully trapped inside the recess is the third defense against water and leakage. The three separate locations the head presses down on the seal create three separate densities of the rubber. The first line of defense is the seal that has escaped from the recess and is directly exposed to the elements. This seal is free to expand back to its regular density and stops the elements from attacking the inner seal. It is the first line of defense. The second line of defense is the barrier of rubber seal located under the lip of the screw head. This seal has been pressed down by the head to an extremely dense but thin layer of material. The third line of defense is the rubber seal that is fully trapped under the head inside the recess. This layer will not be attacked by the elements until the entire first and second lines of defense have completely worn away. This protected seal has been packed to the optimum density.

Within the recess the rubber seal has been quickly trapped at the end of the installation. A very large rubber seal has been compacted into a small void (the recess) and has been compacted into a high pressure seal. That seal will be able to hold extreme amounts of pressure in comparison to the original hex heads, which do not trap the seal in a recess and are very limited as to how much pressure, can be applied to the seal before failure of the seal occurs. The inventive recess design utilizing rounded edges and a wide recess, plus the large rubber seal size to large recess size ratio ensures that a standard rubber seal can be compacted into a high-pressure seal. The shape of the locking anti-back-out teeth ensures that the seal will not be damaged inside the recess.

The threads at the top of the shank are designed to have the extreme last thread 42a at the very top to cut into one side of the anti-back-out locking teeth. The reason for this design feature is to guide the raised metal protrusion in the panel being fastened to ride up onto the locking teeth and ensure contact between the teeth and the panel being fastened.

This thread cut on the shank rising into the locking teeth, also works as a contact limiter because the cut ends equal to the bottom of the headline (the lowest point of the head). Where the thread cut ends will limit how high the panel being fastened will rise into the recess 60. The reason is the shape; flare and curvature of the locking teeth are at such an angle at the headline as to reverse the panel protrusion from rising and it is pushed back down by the ever-flattening angle of the locking teeth.

This universal head and locking device combination can be made to accommodate any type of shank design from a bolt to a screw to a rivet. This design can be made in any scale to accommodate any type of use including boats, trailers, motor homes, trailer homes, RV's, rain gutters and downspouts, airplanes, and all types of metal-to-metal or metal-to-wood contacts.

This design can also be used on roofing flashing including heat vents, eyebrow vents, perimeter and parapet wall caps, metal nosing of all types, and can be used directly on composition roofing in areas where a nail and liquid tar are now acceptable.

FIG. 2A is a side elevation view in partial cross-section of an alternate (no locking teeth) embodiment 100 of a fastener apparatus of this invention during installation, while FIG. 2B is a side elevation view in partial cross-section of the fastener 100 as installed. On this design, the shank threads 102 stop below the headline 104 so as to stop the raised metal panel protrusion from riding into the recess 106 and damaging the seal 108. This is a depth gauge 110 which stops the lip 112 from making contact. This upper shank area is also not threaded so the head to shank connection is larger and stronger so as to support the wide head design without the head easily shearing off.

FIG. 3A is a side elevation view of a self-tightening head embodiment 200 of a fastener apparatus of this invention, while FIG. 3B is a top plan view of the fastener 200 as installed. The head of this particular design works with the snow and ice that is unloading off a rooftop and sliding over the fastener head. The intent is to have a series of raised vertical walls 202 that are sharp at the top 204 and with a backside 206 that slopes down from the top of one vertical wall to the bottom of the next vertical wall. The overall shape is somewhat similar to that of a propeller. The concept has the vertical wall side catching the snow and ice sliding which will apply a turning force in the direction of tightening the fastener. This wall must be limited to prevent snow and ice from over tightening and stripping the fasteners teeth from the substructure.

The backside in this design is sloped from the top of one vertical catch wall, around the head and down to the bottom of the next vertical wall. The intent is to have this fastener work similar to a security fastener that can only be tightened and not loosened, not loosened because there is no catch for a tool to grab onto and loosen it (the sloped side). The sloped backside is always on the opposite side as the catch side due to the propeller shape. This means that the side that would normally have an equal friction to the catch side, forms a ramp and has much less friction applied to the direction, which would unscrew a fastener. All of the actions set forth in this design require snow and ice to slide over the head for it to work.

FIG. 4A is a side elevation view in partial cross-section of a flat head embodiment 300 of a fastener apparatus of this invention during installation, while FIG. 4B is a side elevation view of the fastener 300 as installed. This design works exactly as do the previous embodiments with one exception, the extreme flat top of the head design. This design enhances all of the low profile features described above.

The outer edge 302 of the top of the fastener head 304 may be rounded as shown or it can be designed to incorporate an annular shape to allow a ramp at the first impact point at the edge of the fastener head. This ramp would push the fasteners head down as the snow and ice are pushed upward and over the fastener head. This is similar to the other designs which also intend to create a ramp that pushes the leading edge of the fastener downward, instead of pulling it up and out or sideways if the snow and ice could get under the front of the head. The lack of this ramp on the hex head screw is what causes those fasteners to be pulled out as they are.

To make this fastener design work properly, an increased shank 306 size and properly scaled up anti back-out teeth 308 should be added. The shank and locking teeth should be increased in size to accommodate a tool fitting 310 being punched through the head and into the locking teeth and wider shank. The extreme low profile created may not afford enough depth to accommodate a tool fitting unless the fitting goes through the head and into the shank area. In order to re-strengthen the head back to ANSI Standards, a wider shank should be used. In other words, if to fasten a roof to building code, a #9 size shank were required, then with this particular fastener design one would preferably use a #10 size shank in order to have an equally strong fastener.

FIG. 5 is a side elevation view in partial cross-section of a nail head and elongated thread shank embodiment 400 of a fastener apparatus of this invention during installation. This is a nail design that utilizes many of the features described above. The differences are a nail head 402 which does not require a tool fitting to be punched into it, therefore a standard shank size will remain at its intended strength.

Elongated threads 404 impart a twisting motion during application that will allow the locking teeth 406 to work similarly to how they work when using a shank with screw threads. The fastener spins as it is applied and locks into place when it tries to unscrew, or in the case of the nail, twist out.

In order for the head of the inventive fastener designs to remain strong enough to equal ANSI Standards and pass all required UL Testing for use in the field, while incorporating the deep recess and the inset tool fitting which combined will weaken the head, a ratio between the width of the head and the height of the head should be maintained.

The low profile width to height ratio in this invention is preferably within a range of a minimum 3 parts in width to 1 part in height (i.e., three times wider then it is tall) or 3 to 1, to a maximum of 5 parts in width to 1 part in height (five times wider then it is tall) or 5 to 1.

The most optimal ratios for the fasteners in the fields of metal roofing and/or pre-fabricated steel buildings are 3.5 or 4 to 1. It is desirable to resolve maximum width and required strength issues to meet building codes and also remain within the width of the rib on the manufacturers panel design, while maintaining the desired low profile.

The minimum of 3 to 1 should be maintained because if the ratio is any smaller (such as 2 to 1) the low profile aspect will be lost resulting in a simple rounded top.

The maximum ratio of 5 to 1 should be maintained so that the tool fitting can be punched into the head without weakening the head and making it vulnerable to head shear. The wider the fastener head is, the more leverage the outer edge of the fastener head has to bend and/or break the head from the shank. A minimum depth for a tool fitting is required for installing the fastener; and this tool depth determines the overall width of the fastener when maintaining the ratios. When operating in the fields of metal roofing and steel buildings the average width of the ribs are roughly ⅝ inch, accordingly, the fastener for these industries has a rough width of 5.45 thousands of an inch and therefore would be automatically a height of roughly 1.5 thousands of an inch.

Any larger ratio such as a 6 to 1 or even a 10 to 1 would lead the low profile into a flat top fastener design. In these separate designs the tool fitting must be punched through the head and into the shank of the fastener. There are two ways to solve this: to increase the shank diameter to accommodate the tool, but remain at a lower ANSI Standard for the strength (e.g., a 10 shank would have the strength of an 8 shank); or to incorporate the locking teeth design that returns the strength to the head by adding more steel for the head to shank connection.

There is no one set size for the inventive fastener. The size of the head is determined by the required shank size for a particular project. For example, some steel buildings utilize very large roofing panels and wall panels, which have a wider rib and also require a stronger fastener to meet the building code.

Variable ratios may be used in creating separate fasteners for separate industries or for individual fields of use, to increase or decrease the tool fitting depth and achieve ANSI Standards and therefore maintain the proper torque values and head strengths for the industry in which the fastener will be used.

The flat spot on the top of the fastener is a further variable in the design ratio. In order to make sure a proper tool depth is achieved to properly install the fastener, but also to achieve the perfect height and keep a low profile, the flat spot is the determining height. Once the tool depth is determined the top of the fastener height is determined prior to the tool being punched.

The inventive fastener may be installed in the pan of the building panel and not on top of the rib as it is currently installed. The pan is the extreme bottom wide spot in between the raised ribs of the steel panel. The old style fasteners are normally installed on the top of the rib so as to prepare for the expected failure of the product and when it does fail the rainwater runoff drains down in the pan and not on top of the rib.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A fastener apparatus for securing a workpiece, said fastener apparatus comprising a frusto-hemispherical head and shank appended thereto, said frusto-hemispherical having a body comprising a substantially extended flat top surface a curved outer surface and a peripheral edge, which incorporates a seal seating zone, said head further having a downwardly-appending lip portion extending from said curved outer surface and defining an annular recess within said body creating a leading edge as a shallow ramp for changing sideways and shearing energy of snow and ice into a downward force energy as it rides up said ramp causing snow to ride over and split around the sides of said head, said annular recess having a substantially flat upper surface and substantially vertical sidewalls transitioning from said substantially flat upper surface to said downwardly-appending lip portion, said lip portion having a curved outer edge creating the seal seating zone and a curved lower edge, a series of locking teeth adapted to resist loosening of said fastener from said workpiece, each of said locking teeth having a first end being substantially vertical at said shank and gradually curving to being substantially horizontal within said annular recess at their second end and a midpoint wherein said locking teeth are flared at an approximately 45-degree angle to said first and second ends which is equal to the lowest portion of the outer rim, said shank having a series of threads for engaging said workpiece and drawing said frusto-hemispherical head thereto, said threads extending along said shank toward said head such that a last thread proximate said frusto-hemispherical head cuts into one side of said looking teeth and an annular gasket located within said annular recess, said recess and gasket being sized such that when said fastener apparatus is fully secured to said workpiece, a first portion of said gasket protrudes from said frusto-hemispherical head to provide a first seal, a second portion of said gasket resides and is compressed between and surrounding said curved lower edge of said lip and said workpiece to provide a second seal and a third portion of said gasket remains within said annular recess to provide a third seal.

2. The fastener apparatus of claim 1 wherein said substantially extended flat-top surface is provided with a tool fitting and is formed to provide a stable flat and wide platform for installation with a matching shaped tool driver.

3. The fastener apparatus of claim 1 wherein said locking teeth have front sides and back sides, said locking teeth front sides have vertical walls, said vertical walls are trailing edges thereof as said fastener apparatus is applied to said workpiece and the leading edges thereof as said fastener apparatus is removed from said workpiece, and said locking teeth back sides have angled walls, said angled walls prevent workpiece metal from being honed or stripped when the fastener apparatus is installed in the workpiece.

4. The fastener apparatus of claim 3 wherein said locking teeth are characterized as having sharpened edges in the direction opposite to the direction in which the fastener apparatus is tightened to said workpiece.

5. The fastener apparatus of claim 1 wherein said annular teeth are sized and positioned such that they provide additional mass between said shank and frusto-hemispherical head to substantially increase resistance to head shear, which is required due to the low profile head being thin and the depth of the tool fitting removed having weakened the head to shank connection.

6. The fastener apparatus of claim 1 wherein said looking teeth extend below said frusto-hemispherical head to insure engagement with said workpiece upon application of said fastener apparatus with said workpiece.

7. The fastener apparatus of claim 1 wherein approximately 0.5 to 5 percent of said annular gasket comprises said first seal.

8. The fastener apparatus of claim 1 wherein said frusto-hemispherical head has a width and a height, the ratio of said width and height being approximately 3:1 to 5:1.

9. The fastener apparatus of claim 1 wherein said second portion of said gasket substantially prevents water from penetrating under said frusto-hemispherical head and acts as a scratch barrier between such head and workpiece further acting as a depth gauge working in unison with locking teeth and creating under said locking teeth a seal by merging with the threads of said teeth.

10. The fastener apparatus of claim 1 wherein the depth of said locking teeth is limited to the thickness of panels constituting said workpiece to be fastened.

11. The fastener apparatus of claim 1 wherein threads of said shank are cut directly into said locking teeth in order to ensure contact is made between said locking teeth and panel being fastened and to ensure that no blank thread-less zone exists where spinout of said fastener apparatus can occur.

12. The fastener apparatus of claim 1 wherein the final thread of said shank cuts into said locking teeth to act as a contact limiter.

13. The fastener apparatus of claim 1 wherein a headline exists for sealing and protecting said exposed gasket, said headline being located on the outermost point of said frusto-hemispherical head and around its circumference and is located above the lowest portion of the lip.

14. The fastener apparatus of claim 13 wherein a said seating transition prevents said exposed gasket from being cut.

15. The fastener apparatus of claim 1 wherein said workpiece is deformed around said locking teeth upon engagement of said fastener apparatus to said workpiece, the locking teeth provide an anti-backout function.

16. The fastener apparatus of claim 15 wherein said final thread channel is sized and positioned to cut a guide to form said workpiece and to guide the workpiece over said locking teeth.

17. The fastener apparatus of claim 1 wherein said frusto-hemispherical head is provided with extended flat top surface which is as wide as possible and is preformed to accept a tool fitting into a flat surface rather than a round surface for accuracy which will provide reducing tool costs and to provide enhanced unloading of snow and ice making contact with said frusto-hemispherical head.

18. The fastener apparatus of claim 1 wherein a measurement taken from the bottom of the ceiling portion at the bottom of said locking teeth to the top of said frusto-hemispherical head characterized as having a height to width ratio of from approximately 3:1 to 5:1.

19. A fastener apparatus for securing a workpiece, said fastener apparatus comprising a frusto-hemispherical head and shank appended thereto, said frusto-hemispherical head having a body comprising a substantially extended flat top surface a curved outer surface and a peripheral edge, said head further having a downwardly-appending lip portion extending from said curved outer surface and defining an angular recess within said body, said annular recess having a substantially flat upper surface and substantially vertical sidewalls transitioning from said substantially flat upper surface to said downwardly-appending lip portion, creating a leading edge as a shallow ramp for changing sideways and shearing energy of snow and ice into a downward force energy as it rides up said ramp causing snow to ride over and split around the sides of said head, said lip portion having a curved outer edge a curved lower edge and an annular gasket located within said annular recess, said recess and gasket being sized such that when said fastener apparatus is fully secured to said workpiece, a first portion of said gasket protrudes from said frusto-hemispherical head into the seal seating area to provide a first high pressure seal, a second portion of said gasket resides and is compressed between said curved lower edge of said lip and said workpiece to provide a second seal and a third portion of said gasket remains within said annular recess to provide a third seal.

20. The fastener apparatus of claim 19 wherein the third portion of said gasket is fully protected from ultraviolet radiation and represents the majority of the sealing function while said first seal acts as a depth gauge as it begins to compress under said frusto-hemispherical head.

21. The fastener apparatus of claim 19 wherein said first portion of said gasket acts as a first line of defense working in unison to extend the life of said gasket by allowing the gasket to deteriorate progressively from each line of defense to the next and by further providing a scratch barrier and creating a depth gauge from said gasket upon applying said fastener apparatus to said workpiece and further acting as a visual depth gauge as rubber escapes from said annular recess into plain view allowing an installer to visually confirm that said fastener apparatus has been installed.

22. The fastener apparatus of claim 19 wherein said gasket, in its uncompressed state, occupies approximately 85-95 percent of the width of said annular recess but does not fully fill said annular recess until said gasket is compressed by applying said fastener apparatus to said workpiece until compressed to expand to fully fill the width of said annular recess where it stops expanding radially within the annular recess by hitting the recess walls whereupon the bottom portion of the gasket squeezes from the bottommost portion of the recess under said lip portion to create said first seal, second seal and third seal, creating an overall high pressure seal, with three lines of defense.

23. The fastener apparatus of claim 19 wherein 0.5-5.0 percent of said gasket comprises first seal extending from said frusto-hemispherical head upon application of said fastener apparatus to said workpiece and wherein the ratio of gasket seal to annular recess height is approximately from 1.75:1 to 2.3:1.

* * * * *

UNITED STATES PATENT AND TRADEMARK OFFICE
CERTIFICATE OF CORRECTION

| | | |
|---|---|---|
| PATENT NO. | : 7,329,077 B2 | |
| APPLICATION NO. | : 11/110168 | |
| DATED | : February 12, 2008 | |
| INVENTOR(S) | : David A. W. Curtis | |

It is certified that error appears in the above-identified patent and that said Letters Patent is hereby corrected as shown below:

Col. 12 lines 64-71 should read

1. A fastener apparatus for securing a workpiece, said fastener apparatus comprising a frusto-hemispherical head and shank appended thereto, said frusto-hemispherical head having a body comprising a substantially extended flat top surface, a curved outer surface, and a peripheral edge, which incorporates a seal seating zone, said head further having a downwardly-appending lip portion extending from said curved outer surface and defining an annular recess within said body, said frusto-hemispherical head Col. 13 lines 1-12 should read creating a leading edge as a shallow ramp for changing sideways and shearing energy of snow and ice into a downward force energy as it rides up said ramp causing snow to ride over and split around the sides of said head, said annular recess having a substantially flat upper surface and substantially vertical sidewalls transitioning from said substantially flat upper surface to said downwardly-appending lip portion, said lip portion having a curved edge extending from within the recess to the peripheral edge creating the seal seating zone, a series of locking teeth adapted to resist loosening of said fastener from said workpiece, each of said locking teeth having a first end being substantially vertical at said shank and gradually curving

UNITED STATES PATENT AND TRADEMARK OFFICE
CERTIFICATE OF CORRECTION

PATENT NO.       : 7,329,077 B2
APPLICATION NO.  : 11/110168
DATED            : February 12, 2008
INVENTOR(S)      : David A. W. Curtis It is certified that error appears in the above-identified patent and that said Letters Patent is hereby corrected as shown below:

Con't Col 13 lines 13-32 should read to being substantially horizontal within said annular recess at their second end and a midpoint wherein said locking teeth are oriented at an approximately 45-degree angle to said first and second ends, said shank having a series of threads for engaging said workpiece and drawing said frusto-hemispherical head thereto, said threads extending along said shank toward said head such that a last thread proximate said frusto-hemispherical head cuts into one side of said locking teeth and an annular gasket located within said annular recess, said recess and gasket being sized such that when said fastener apparatus is fully secured to said workpiece, a first portion of said gasket protrudes from said frusto-hemispherical head to provide a first seal, a second portion of said gasket resides and is compressed between and surrounding said curved edge of said lip and said workpiece to Con't Col. 13 lines 33-35 should read provide a second seal and a third portion of said gasket remains within said annular recess to provide a third seal.

UNITED STATES PATENT AND TRADEMARK OFFICE
CERTIFICATE OF CORRECTION

| | | |
|---|---|---|
| PATENT NO. | : 7,329,077 B2 | |
| APPLICATION NO. | : 11/110168 | |
| DATED | : February 12, 2008 | |
| INVENTOR(S) | : David A. W. Curtis | |

It is certified that error appears in the above-identified patent and that said Letters Patent is hereby corrected as shown below:

Col. 13 lines 36-39 should read

2. The fastener apparatus of claim 1, wherein said substantially extended flat-top surface is provided with a tool fitting and is formed to provide a stable flat and wide platform for installation with a matching shaped tool driver.

Col. 13 lines 40-46 should read

3. The fastener apparatus of claim 1, wherein said locking teeth have front sides and back sides, said locking teeth front sides have vertical walls, said vertical walls are trailing edges thereof as said fastener apparatus is applied to said workpiece and the leading edges thereof as said fastener apparatus is removed from said workpiece, and said locking teeth back sides have angled walls, said angled walls prevent workpiece metal from Con't Col. 13 lines 47-48 should read being honed or stripped when the fastener apparatus is installed in the workpiece.

Col. 13 lines 49-52 should read

4. The fastener apparatus of claim 3, wherein said locking teeth are characterized as having sharpened edges in the direction opposite to the direction in which the fastener apparatus is tightened to said workpiece.

UNITED STATES PATENT AND TRADEMARK OFFICE
CERTIFICATE OF CORRECTION

| | | |
|---|---|---|
| PATENT NO. | : 7,329,077 B2 | |
| APPLICATION NO. | : 11/110168 | |
| DATED | : February 12, 2008 | |
| INVENTOR(S) | : David A. W. Curtis | |

It is certified that error appears in the above-identified patent and that said Letters Patent is hereby corrected as shown below:

Col. 13 lines 53-60 should read

5. The fastener apparatus of claim 1, wherein said annular teeth are sized and positioned such that they provide additional mass between said shank and frusto-hemispherical head to substantially increase resistance to head shear, which is required due to the head being thin and the depth of the tool fitting removed having weakened the head to shank connection.

Col. 13 lines 61-64 should read

6. The fastener apparatus of claim 1, wherein said looking teeth extend below said frusto-hemispherical head to insure engagement with said workpiece upon application of said fastener apparatus with said workpiece.

Col. 13 lines 65-67 should read

7. The fastener apparatus of claim 1, wherein approximately 0.5 to 5 percent of said annular gasket comprises said first seal.

Col. 14 lines 1-3 should read

8. The fastener apparatus of claim 1, wherein said frusto-hemispherical head has a width and a height, the ratio of said width and height being approximately 3:1 to 5:1.

UNITED STATES PATENT AND TRADEMARK OFFICE
CERTIFICATE OF CORRECTION

PATENT NO. : 7,329,077 B2
APPLICATION NO. : 11/110168
DATED : February 12, 2008
INVENTOR(S) : David A. W. Curtis It is certified that error appears in the above-identified patent and that said Letters Patent is hereby corrected as shown below:

Col. 14 lines 4-10 should read

9. A fastener apparatus for securing a workpiece, said fastener apparatus comprising a frusto-hemispherical head and shank appended thereto, said frusto-hemispherical head having a Con't Col. 14 lines 11-23 should read body comprising a substantially extended flat top surface, a curved outer surface, and a peripheral edge, said head further having a downwardly-appending lip portion extending from said curved outer surface and defining an annular recess within said body, said annular recess having a substantially flat upper surface and substantially vertical sidewalls transitioning from said substantially flat upper surface to said downwardly-appending lip portion, said frusto-hemispherical head creating a leading edge as a shallow ramp for changing sideways and shearing energy of snow and ice into a downward force energy as it rides up said ramp causing snow to ride over and split around the sides of said head, said lip portion having a curved edge, a curved edge extending from within the recess to the peripheral edge, and

UNITED STATES PATENT AND TRADEMARK OFFICE
CERTIFICATE OF CORRECTION

| | | |
|---|---|---|
| PATENT NO. | : 7,329,077 B2 | |
| APPLICATION NO. | : 11/110168 | |
| DATED | : February 12, 2008 | |
| INVENTOR(S) | : David A. W. Curtis | |

It is certified that error appears in the above-identified patent and that said Letters Patent is hereby corrected as shown below:

Con't Col. 14 lines 24-32 should read an annular gasket located within said annular recess, said recess and gasket being sized such that when said fastener apparatus is fully secured to said workpiece, a first portion of said gasket protrudes from said frusto-hemispherical head into a seal seating area to provide a first high pressure seal, a second portion of said gasket resides and is compressed between said curved edge of said lip and said workpiece to provide a second seal, and a third portion of said gasket remains within said annular recess to provide a third seal.

Col. 14 lines 33-36 should read

10. The fastener apparatus of claim 9, wherein the third portion of said gasket is fully protected from ultraviolet radiation and represents the majority of the sealing function while said first seal acts as a depth gauge as it begins to Con't Col. 14 lines 37 should read compress under said frusto-hemispherical head.

UNITED STATES PATENT AND TRADEMARK OFFICE
CERTIFICATE OF CORRECTION

| | |
|---|---|
| PATENT NO. | : 7,329,077 B2 |
| APPLICATION NO. | : 11/110168 |
| DATED | : February 12, 2008 |
| INVENTOR(S) | : David A. W. Curtis |

It is certified that error appears in the above-identified patent and that said Letters Patent is hereby corrected as shown below:

Col. 14 lines 38-44 should read

11. The fastener apparatus of claim 1, wherein said second portion of said gasket substantially prevents water from penetrating under said frusto-hemispherical head and acts as a scratch barrier between such head and workpiece further acting as a depth gauge working in unison with locking teeth and creating under said locking teeth a seal by merging with the threads of said teeth.

Col. 14 lines 45-49 should read

12. The fastener apparatus of claim 9, wherein said first portion of said gasket acts as a first line of defense working in unison to extend the life of said gasket by allowing the gasket to deteriorate progressively from each line of defense to the next and by further providing a scratch barrier and creating a Con't Col. 14 lines 50-54 should read depth gauge from said gasket upon applying said fastener apparatus to said workpiece, and further acting as a visual depth gauge as rubber escapes from said annular recess into plain view allowing an installer to visually confirm that said fastener apparatus has been installed.

UNITED STATES PATENT AND TRADEMARK OFFICE
CERTIFICATE OF CORRECTION

| | | |
|---|---|---|
| PATENT NO. | : 7,329,077 B2 | |
| APPLICATION NO. | : 11/110168 | |
| DATED | : February 12, 2008 | |
| INVENTOR(S) | : David A. W. Curtis | |

It is certified that error appears in the above-identified patent and that said Letters Patent is hereby corrected as shown below:

Col. 14 lines 55-62 should read

13. The fastener apparatus of claim 9, wherein said gasket, in its uncompressed state, occupies approximately 85 - 95 percent of the width of said annular recess but does not fully fill said annular recess until said gasket is compressed by applying said fastener apparatus to said workpiece until compressed to expand to fully fill the width of said annular recess where it stops expanding radially within the annular recess by hitting the recess walls whereupon the bottom portion of the gasket squeezes Con't Col. 14 lines 63-65 should read the recess under said lip portion to create said first seal, second seal and third seal, creating an overall high pressure seal with three lines of defense.

Col. 15 lines 1-5 should read

14. The fastener apparatus of claim 9, wherein 0.5 - 5.0 percent of said gasket comprises first seal extending from said frusto-hemispherical head upon application of said fastener apparatus to said workpiece, and wherein the ratio of gasket seal to annular recess height is approximately from 1.75:1 to 2.3:1.

Col. 15 lines 6-8 should read

15. The fastener apparatus of claim 1, wherein the depth of said locking teeth is limited to the thickness of panels constituting said workpiece to be fastened.

UNITED STATES PATENT AND TRADEMARK OFFICE
CERTIFICATE OF CORRECTION

| | | |
|---|---|---|
| PATENT NO. | : 7,329,077 B2 | |
| APPLICATION NO. | : 11/110168 | |
| DATED | : February 12, 2008 | |
| INVENTOR(S) | : David A. W. Curtis | |

It is certified that error appears in the above-identified patent and that said Letters Patent is hereby corrected as shown below:

Col. 15 lines 9-10 should read

16. The fastener apparatus of claim 1, wherein threads of said shank are cut directly into said locking teeth in order to Con't Col. 15 lines 11-13 should read ensure contact is made between said locking teeth and panel being fastened and to ensure that no blank thread-less zone exists where spinout of said fastener apparatus can occur.

Col. 15 lines 14-16 should read

17. The fastener apparatus of claim 1, wherein the final thread of said shank cuts into said locking teeth to act as a contact limiter.

Col. 15 lines 17-21 should read 18. the fastener apparatus of claim 1, wherein a headline exists for sealing and protecting said exposed gasket, said headline being located on the outermost point of said frusto-hemispherical head and around its circumference and is located above the lowest portion of the lip.

Col. 15 lines 22-23 should read

19. The fastener apparatus of claim 18, wherein said seating transition prevents said exposed gasket from being cut.

UNITED STATES PATENT AND TRADEMARK OFFICE
CERTIFICATE OF CORRECTION

| | | |
|---|---|---|
| PATENT NO. | : 7,329,077 B2 | Page 10 of 11 |
| APPLICATION NO. | : 11/110168 | |
| DATED | : February 12, 2008 | |
| INVENTOR(S) | : David A. W. Curtis | |

It is certified that error appears in the above-identified patent and that said Letters Patent is hereby corrected as shown below:

Col. 15 lines 24-27 should read

20. The fastener apparatus of claim 1, wherein said workpiece is deformed around said locking teeth upon engagement of said fastener apparatus to said workpiece, the locking teeth provide an anti-backout function.

Col. 15 lines 28-31 should read

21. The fastener apparatus of claim 20, wherein said final thread channel is sized and positioned to cut a guide to form said workpiece and to guide the workpiece over said locking teeth.

Col. 15 lines 32-36 should read

22. The fastener apparatus of claim 1, wherein said frusto-hemispherical head is provided with extended flat top surface which is as wide as possible and is preformed to accept a tool fitting into a flat surface rather than a round surface for accuracy which will provide reducing tool costs and to provide Con't Col. 15 lines 37-38 should read enhanced unloading of snow and ice making contact with said frusto-hemispherical head.

UNITED STATES PATENT AND TRADEMARK OFFICE
CERTIFICATE OF CORRECTION

| | |
|---|---|
| PATENT NO. | : 7,329,077 B2 |
| APPLICATION NO. | : 11/110168 |
| DATED | : February 12, 2008 |
| INVENTOR(S) | : David A. W. Curtis |

It is certified that error appears in the above-identified patent and that said Letters Patent is hereby corrected as shown below:

Col. 15 lines 39-44 should read

23. The fastener apparatus of claim 1, wherein a measurement taken from the bottom of the sealing portion at the bottom of said locking teeth to the top of said frusto-hemispherical head is characterized as having a height to width ratio of from approximately 3:1 to 5:1.

Signed and Sealed this

Third Day of March, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,329,077 B2
APPLICATION NO. : 11/110168
DATED : February 12, 2008
INVENTOR(S) : David A. W. Curtis It is certified that error appears in the above-identified patent and that said Letters Patent is hereby corrected as shown below:

Col. 12 lines 64-71 should read

1. A fastener apparatus for securing a workpiece, said fastener apparatus comprising a frusto-hemispherical head and shank appended thereto, said frusto-hemispherical head having a body comprising a substantially extended flat top surface, a curved outer surface, and a peripheral edge, which incorporates a seal seating zone, said head further having a downwardly-appending lip portion extending from said curved outer surface and defining an annular recess within said body, said frusto-hemispherical head Col. 13 lines 1-12 should read creating a leading edge as a shallow ramp for changing sideways and shearing energy of snow and ice into a downward force energy as it rides up said ramp causing snow to ride over and split around the sides of said head, said annular recess having a substantially flat upper surface and substantially vertical sidewalls transitioning from said substantially flat upper surface to said downwardly-appending lip portion, said lip portion having a curved edge extending from within the recess to the peripheral edge creating the seal seating zone, a series of locking teeth adapted to resist loosening of said fastener from said workpiece, each of said locking teeth having a first end being substantially vertical at said shank and gradually curving

UNITED STATES PATENT AND TRADEMARK OFFICE
CERTIFICATE OF CORRECTION

| | | |
|---|---|---|
| PATENT NO. | : 7,329,077 B2 | |
| APPLICATION NO. | : 11/110168 | |
| DATED | : February 12, 2008 | |
| INVENTOR(S) | : David A. W. Curtis | |

It is certified that error appears in the above-identified patent and that said Letters Patent is hereby corrected as shown below:

Con't Col 13 lines 13-32 should read to being substantially horizontal within said annular recess at their second end and a midpoint wherein said locking teeth are oriented at an approximately 45-degree angle to said first and second ends, said shank having a series of threads for engaging said workpiece and drawing said frusto-hemispherical head thereto, said threads extending along said shank toward said head such that a last thread proximate said frusto-hemispherical head cuts into one side of said locking teeth and an annular gasket located within said annular recess, said recess and gasket being sized such that when said fastener apparatus is fully secured to said workpiece, a first portion of said gasket protrudes from said frusto-hemispherical head to provide a first seal, a second portion of said gasket resides and is compressed between and surrounding said curved edge of said lip and said workpiece to Con't Col. 13 lines 33-35 should read provide a second seal and a third portion of said gasket remains within said annular recess to provide a third seal.

UNITED STATES PATENT AND TRADEMARK OFFICE
CERTIFICATE OF CORRECTION

PATENT NO. : 7,329,077 B2
APPLICATION NO. : 11/110168
DATED : February 12, 2008
INVENTOR(S) : David A. W. Curtis It is certified that error appears in the above-identified patent and that said Letters Patent is hereby corrected as shown below:

Col. 13 lines 36-39 should read

2. The fastener apparatus of claim 1, wherein said substantially extended flat-top surface is provided with a tool fitting and is formed to provide a stable flat and wide platform for installation with a matching shaped tool driver.

Col. 13 lines 40-46 should read

3. The fastener apparatus of claim 1, wherein said locking teeth have front sides and back sides, said locking teeth front sides have vertical walls, said vertical walls are trailing edges thereof as said fastener apparatus is applied to said workpiece and the leading edges thereof as said fastener apparatus is removed from said workpiece, and said locking teeth back sides have angled walls, said angled walls prevent workpiece metal from Con't Col. 13 lines 47-48 should read being honed or stripped when the fastener apparatus is installed in the workpiece.

Col. 13 lines 49-52 should read

4. The fastener apparatus of claim 3, wherein said locking teeth are characterized as having sharpened edges in the direction opposite to the direction in which the fastener apparatus is tightened to said workpiece.

UNITED STATES PATENT AND TRADEMARK OFFICE
CERTIFICATE OF CORRECTION

PATENT NO.       : 7,329,077 B2
APPLICATION NO.  : 11/110168
DATED            : February 12, 2008
INVENTOR(S)      : David A. W. Curtis It is certified that error appears in the above-identified patent and that said Letters Patent is hereby corrected as shown below:

Col. 13 lines 53-60 should read

5. The fastener apparatus of claim 1, wherein said annular teeth are sized and positioned such that they provide additional mass between said shank and frusto-hemispherical head to substantially increase resistance to head shear, which is required due to the head being thin and the depth of the tool fitting removed having weakened the head to shank connection.

Col. 13 lines 61-64 should read

6. The fastener apparatus of claim 1, wherein said looking teeth extend below said frusto-hemispherical head to insure engagement with said workpiece upon application of said fastener apparatus with said workpiece.

Col. 13 lines 65-67 should read

7. The fastener apparatus of claim 1, wherein approximately 0.5 to 5 percent of said annular gasket comprises said first seal.

Col. 14 lines 1-3 should read

8. The fastener apparatus of claim 1, wherein said frusto-hemispherical head has a width and a height, the ratio of said width and height being approximately 3:1 to 5:1.

UNITED STATES PATENT AND TRADEMARK OFFICE
CERTIFICATE OF CORRECTION

PATENT NO. : 7,329,077 B2
APPLICATION NO. : 11/110168
DATED : February 12, 2008
INVENTOR(S) : David A. W. Curtis It is certified that error appears in the above-identified patent and that said Letters Patent is hereby corrected as shown below:

Col. 14 lines 4-10 should read

9. A fastener apparatus for securing a workpiece, said fastener apparatus comprising a frusto-hemispherical head and shank appended thereto, said frusto-hemispherical head having a Con't Col. 14 lines 11-23 should read body comprising a substantially extended flat top surface, a curved outer surface, and a peripheral edge, said head further having a downwardly-appending lip portion extending from said curved outer surface and defining an annular recess within said body, said annular recess having a substantially flat upper surface and substantially vertical sidewalls transitioning from said substantially flat upper surface to said downwardly-appending lip portion, said frusto-hemispherical head creating a leading edge as a shallow ramp for changing sideways and shearing energy of snow and ice into a downward force energy as it rides up said ramp causing snow to ride over and split around the sides of said head, said lip portion having a curved edge, a curved edge extending from within the recess to the peripheral edge, and

UNITED STATES PATENT AND TRADEMARK OFFICE
CERTIFICATE OF CORRECTION

PATENT NO.       : 7,329,077 B2
APPLICATION NO.  : 11/110168
DATED            : February 12, 2008
INVENTOR(S)      : David A. W. Curtis It is certified that error appears in the above-identified patent and that said Letters Patent is hereby corrected as shown below:

Con't Col. 14 lines 24-32 should read an annular gasket located within said annular recess, said recess and gasket being sized such that when said fastener apparatus is fully secured to said workpiece, a first portion of said gasket protrudes from said frusto-hemispherical head into a seal seating area to provide a first high pressure seal, a second portion of said gasket resides and is compressed between said curved edge of said lip and said workpiece to provide a second seal, and a third portion of said gasket remains within said annular recess to provide a third seal.

Col. 14 lines 33-36 should read

10. The fastener apparatus of claim 9, wherein the third portion of said gasket is fully protected from ultraviolet radiation and represents the majority of the sealing function while said first seal acts as a depth gauge as it begins to Con't Col. 14 lines 37 should read compress under said frusto-hemispherical head.

UNITED STATES PATENT AND TRADEMARK OFFICE
CERTIFICATE OF CORRECTION

| | | |
|---|---|---|
| PATENT NO. | : 7,329,077 B2 | |
| APPLICATION NO. | : 11/110168 | |
| DATED | : February 12, 2008 | |
| INVENTOR(S) | : David A. W. Curtis | |

It is certified that error appears in the above-identified patent and that said Letters Patent is hereby corrected as shown below:

Col. 14 lines 38-44 should read

11. The fastener apparatus of claim 1, wherein said second portion of said gasket substantially prevents water from penetrating under said frusto-hemispherical head and acts as a scratch barrier between such head and workpiece further acting as a depth gauge working in unison with locking teeth and creating under said locking teeth a seal by merging with the threads of said teeth.

Col. 14 lines 45-49 should read

12. The fastener apparatus of claim 9, wherein said first portion of said gasket acts as a first line of defense working in unison to extend the life of said gasket by allowing the gasket to deteriorate progressively from each line of defense to the next and by further providing a scratch barrier and creating a Con't Col. 14 lines 50-54 should read depth gauge from said gasket upon applying said fastener apparatus to said workpiece, and further acting as a visual depth gauge as rubber escapes from said annular recess into plain view allowing an installer to visually confirm that said fastener apparatus has been installed.

UNITED STATES PATENT AND TRADEMARK OFFICE
CERTIFICATE OF CORRECTION

PATENT NO.      : 7,329,077 B2
APPLICATION NO. : 11/110168
DATED           : February 12, 2008
INVENTOR(S)     : David A. W. Curtis It is certified that error appears in the above-identified patent and that said Letters Patent is hereby corrected as shown below:

Col. 14 lines 55-62 should read

13. The fastener apparatus of claim 9, wherein said gasket, in its uncompressed state, occupies approximately 85 - 95 percent of the width of said annular recess but does not fully fill said annular recess until said gasket is compressed by applying said fastener apparatus to said workpiece until compressed to expand to fully fill the width of said annular recess where it stops expanding radially within the annular recess by hitting the recess walls whereupon the bottom portion of the gasket squeezes Con't Col. 14 lines 63-65 should read the recess under said lip portion to create said first seal, second seal and third seal, creating an overall high pressure seal with three lines of defense.

Col. 15 lines 1-5 should read

14. The fastener apparatus of claim 9, wherein 0.5 - 5.0 percent of said gasket comprises first seal extending from said frusto-hemispherical head upon application of said fastener apparatus to said workpiece, and wherein the ratio of gasket seal to annular recess height is approximately from 1.75:1 to 2.3:1.

Col. 15 lines 6-8 should read

15. The fastener apparatus of claim 1, wherein the depth of said locking teeth is limited to the thickness of panels constituting said workpiece to be fastened.

UNITED STATES PATENT AND TRADEMARK OFFICE
CERTIFICATE OF CORRECTION

PATENT NO. : 7,329,077 B2
APPLICATION NO. : 11/110168
DATED : February 12, 2008
INVENTOR(S) : David A. W. Curtis It is certified that error appears in the above-identified patent and that said Letters Patent is hereby corrected as shown below:

Col. 15 lines 9-10 should read

16. The fastener apparatus of claim 1, wherein threads of said shank are cut directly into said locking teeth in order to Con't Col. 15 lines 11-13 should read ensure contact is made between said locking teeth and panel being fastened and to ensure that no blank thread-less zone exists where spinout of said fastener apparatus can occur.

Col. 15 lines 14-16 should read

17. The fastener apparatus of claim 1, wherein the final thread of said shank cuts into said locking teeth to act as a contact limiter.

Col. 15 lines 17-21 should read

18. The fastener apparatus of claim 1, wherein a headline exists for sealing and protecting said exposed gasket, said headline being located on the outermost point of said frusto-hemispherical head and around its circumference and is located above the lowest portion of the lip.

Col. 15 lines 22-23 should read

19. The fastener apparatus of claim 18, wherein said seating transition prevents said exposed gasket from being cut.

UNITED STATES PATENT AND TRADEMARK OFFICE
CERTIFICATE OF CORRECTION

PATENT NO.        : 7,329,077 B2
APPLICATION NO.   : 11/110168
DATED             : February 12, 2008
INVENTOR(S)       : David A. W. Curtis It is certified that error appears in the above-identified patent and that said Letters Patent is hereby corrected as shown below:

Col. 15 lines 24-27 should read

20. The fastener apparatus of claim 1, wherein said workpiece is deformed around said locking teeth upon engagement of said fastener apparatus to said workpiece, the locking teeth provide an anti-backout function.

Col. 15 lines 28-31 should read

21. The fastener apparatus of claim 20, wherein said final thread channel is sized and positioned to cut a guide to form said workpiece and to guide the workpiece over said locking teeth.

Col. 15 lines 32-36 should read

22. The fastener apparatus of claim 1, wherein said frusto-hemispherical head is provided with extended flat top surface which is as wide as possible and is preformed to accept a tool fitting into a flat surface rather than a round surface for accuracy which will provide reducing tool costs and to provide Con't Col. 15 lines 37-38 should read enhanced unloading of snow and ice making contact with said frusto-hemispherical head.

UNITED STATES PATENT AND TRADEMARK OFFICE
CERTIFICATE OF CORRECTION

PATENT NO.        : 7,329,077 B2
APPLICATION NO. : 11/110168
DATED             : February 12, 2008
INVENTOR(S)       : David A. W. Curtis It is certified that error appears in the above-identified patent and that said Letters Patent is hereby corrected as shown below:

Col. 15 lines 39-44 should read

23. The fastener apparatus of claim 1, wherein a measurement taken from the bottom of the sealing portion at the bottom of said locking teeth to the top of said frusto-hemispherical head is characterized as having a height to width ratio of from approximately 3:1 to 5:1.

This certificate supersedes the Certificate of Correction issued March 3, 2009.

Signed and Sealed this

Fourteenth Day of April, 2009

JOHN DOLL
*Acting Director of the United States Patent and Trademark Office*